(12) United States Patent
Knolle

(10) Patent No.: US 11,821,312 B2
(45) Date of Patent: Nov. 21, 2023

(54) DRILLING RIG AND METHODS USING MULTIPLE TYPES OF DRILLING FOR INSTALLING GEOTHERMAL SYSTEMS

(71) Applicant: Terra Sonic International, LLC, Marietta, OH (US)

(72) Inventor: L. Mark Knolle, Marietta, OH (US)

(73) Assignee: Terra Sonic International, LLC, Marietta, OH (US)

( * ) Notice: Subject to any disclaimer, the term of this patent is extended or adjusted under 35 U.S.C. 154(b) by 55 days.

(21) Appl. No.: 17/416,898

(22) PCT Filed: Dec. 20, 2019

(86) PCT No.: PCT/US2019/068015
§ 371 (c)(1),
(2) Date: Jun. 21, 2021

(87) PCT Pub. No.: WO2020/132545
PCT Pub. Date: Jun. 25, 2020

(65) Prior Publication Data
US 2022/0065045 A1     Mar. 3, 2022

Related U.S. Application Data

(60) Provisional application No. 62/783,691, filed on Dec. 21, 2018.

(51) Int. Cl.
*E21B 7/24*     (2006.01)
*E21B 7/02*     (2006.01)
(Continued)

(52) U.S. Cl.
CPC ............. *E21B 7/24* (2013.01); *E21B 1/24* (2020.05); *E21B 1/26* (2020.05); *E21B 4/14* (2013.01);
(Continued)

(58) Field of Classification Search
CPC ..... E21B 7/24; E21B 1/26; E21B 7/02; E21B 21/065; E21B 1/24; E21B 4/14; F24T 10/00; F24T 1010/53; Y02E 10/10
See application file for complete search history.

(56) References Cited

U.S. PATENT DOCUMENTS 2,942,849 A     6/1960  Bodine
3,394,766 A *   7/1968  Lebelle ................ E02D 7/18
                                              74/61

(Continued)

OTHER PUBLICATIONS

International Searching Authority, Search Report and Written Opinion issued in International Application No. PCT/US2019/068015 dated Mar. 18, 2020 (11 pages).

*Primary Examiner* — Nicole Coy
(74) *Attorney, Agent, or Firm* — Wood Herron & Evans LLP

(57) ABSTRACT

A drilling rig and methods are provided for using multiple types of drilling when installing geothermal systems. The drilling rig can perform sonic drilling such as percussive sonic drilling and a type of non-sonic drilling. Control switching valves are added to the hydraulics of the drilling rig to selectively provide sufficient flow of hydraulic fluid to motors used in the multiple types of drilling, depending on which type of drilling is currently most efficient for the underground formation being drilled. The water pump and hydraulic motor for such have been designed to handle both types of drilling on a small drilling rig frame, thereby allowing for the drilling to occur in space-constrained environments. A method of recycling water used to remove cuttings during drilling to put back downhole is also provided.

11 Claims, 6 Drawing Sheets

(51) Int. Cl.
- *E21B 21/06* (2006.01)
- *E21B 1/26* (2006.01)
- *E21B 4/14* (2006.01)
- *E21B 1/24* (2006.01)
- *F24T 10/00* (2018.01)

(52) U.S. Cl.
CPC .............. *E21B 7/02* (2013.01); *E21B 21/065* (2013.01); *F24T 10/00* (2018.05); *F24T 2010/53* (2018.05)

(56) References Cited

U.S. PATENT DOCUMENTS

| | | |
|---|---|---|
| 3,424,254 A | 1/1969 | Huff |
| 3,975,912 A | 8/1976 | Greene |
| 4,052,857 A | 10/1977 | Altschuler |
| 4,094,356 A | 6/1978 | Ash et al. |
| 4,403,665 A | 9/1983 | Bodine |
| 4,667,742 A | 5/1987 | Bodine |
| 5,370,182 A | 12/1994 | Hickerson |
| 5,417,290 A | 5/1995 | Barrow |
| 5,549,170 A | 8/1996 | Barrow |
| 5,562,169 A | 10/1996 | Barrow |
| 5,566,758 A | 10/1996 | Forester |
| 5,634,515 A | 6/1997 | Lambert |
| 5,800,096 A * | 9/1998 | Barrow .................. E02D 7/26 405/249 |
| 6,955,219 B2 | 10/2005 | Johnson, Jr. |
| 6,968,910 B2 | 11/2005 | Bar-Cohen et al. |
| 7,093,657 B2 | 8/2006 | Johnson, Jr. |
| 7,270,182 B2 | 9/2007 | Johnson, Jr. |
| 7,647,988 B2 | 1/2010 | Roussy |
| 7,891,440 B2 | 2/2011 | Roussy |
| 8,002,502 B2 | 8/2011 | Roussy |
| 8,020,636 B2 | 9/2011 | Wurm |
| 8,074,740 B2 | 12/2011 | Roussy |
| 8,118,115 B2 | 2/2012 | Roussy |
| 8,132,631 B2 | 3/2012 | Roussy |
| 8,136,611 B2 | 3/2012 | Roussy |
| 8,210,281 B2 | 7/2012 | Roussy |
| 8,307,530 B1 | 11/2012 | Neff et al. |
| 9,109,398 B2 | 8/2015 | Harris et al. |
| 2002/0112888 A1 | 8/2002 | Leuchtenberg |
| 2003/0221870 A1 | 12/2003 | Johnson |
| 2006/0191719 A1 | 8/2006 | Roussy |
| 2007/0163805 A1 | 7/2007 | Trevisani et al. |
| 2008/0083565 A1 | 4/2008 | Roussy |
| 2008/0093125 A1 | 4/2008 | Potter et al. |
| 2010/0032207 A1 | 2/2010 | Potter et al. |
| 2010/0084193 A1 | 4/2010 | Livingstone |
| 2010/0272515 A1 | 10/2010 | Curlett |
| 2011/0162892 A1 | 7/2011 | Oothoudt |
| 2011/0174537 A1 | 7/2011 | Potter et al. |
| 2015/0211301 A1 | 7/2015 | King |
| 2017/0268803 A1 | 9/2017 | Cauchy |

\* cited by examiner

DRILLING RIG AND METHODS USING MULTIPLE TYPES OF DRILLING FOR INSTALLING GEOTHERMAL SYSTEMS

CROSS-REFERENCE TO RELATED APPLICATIONS

This application is a national phase entry of, and claims priority to, International Application No. PCT/US2019/068015, filed Dec. 20, 2019, which claimed priority to U.S. Provisional Patent Application No. 62/783,691, filed on Dec. 21, 2018, the entire contents of which are herein incorporated by reference.

TECHNICAL FIELD

This application relates generally to drilling systems and methods. More specifically, this application describes systems and methods for using sonic drilling and other types of drilling in the same rig and/or application, particularly for installing geothermal systems.

BACKGROUND

Geothermal heat exchange systems typically include heat exchanger loops installed into the ground by about 150 feet to about 400 feet in depth. These geothermal loops exchange heat energy between the underground (which is generally stable in temperature) and the ambient above the ground (which varies dramatically in temperature with changes in season, etc.). Geothermal systems are generally energy-efficient and environmentally friendly, so such systems have become more favored with time as other conventional heating and cooling sources such as natural gas and oil become scarcer and more expensive. A primary challenge for geothermal technology is handling the logistics of drilling holes and installing the geothermal loops at the beginning of the process, and these steps can be made exceedingly difficult in some space-constrained residential and commercial areas where geothermal technologies would be beneficial. As a result, geothermal heat exchange systems have not achieved widespread use as compared to other heating and cooling technologies.

Different drilling technologies and systems have been used to form holes and conduct mining and wellbore operations for years. One known drilling technology is sonic drilling. In sonic drilling, a drill pipe or drill string is driven into the ground while being subjected to acoustic vibrations generated by the sonic drill head. Such vibrations help the end of the drill string fluidize the ground beneath the drill string to enable easier further insertion to lower depths within the ground. Fluid may be circulated within the bore hole in a sonic drilling process, such as, for example, when a core sample is to be obtained and analyzed. Sonic drilling has been used in the field of geothermal construction because a sonic drill rig is capable of drilling and casing a hole and installing a loop and grout in one operation.

Sonic drilling is an ideal drilling technology to use with some types of underground formations. For example, some types of mixed soils encountered at certain depths underground in certain regions of the world are difficult for other conventional drilling technologies (including auger-based drilling and the like) to penetrate through, while sonic drilling can handle such formations with ease. A surface layer called overburden is typically formed from loose, unconsolidated material, and sonic drilling is more effective at quickly penetrating and installing a casing through the overburden. However, once the overburden has been drilled through and harder rock formations are encountered underground, other types of drilling may become equivalent or preferable in functionality and efficiency as compared to sonic drilling.

As a result of the specialized equipment and technology involved, sonic drill rigs are typically provided on drilling rigs dedicated to this type of drilling. Consequently, when another type of drilling is desired, an entirely different drilling rig must be moved into position and the sonic drill rig removed. Such a process is time consuming and cost-inefficient, and in some contexts like residential geothermal installations, space constraints may prevent the use of multiple drilling rigs for such jobs. As a result, drilling rigs with a single type of drill (sonic or non-sonic) may be used to drill an entire hole for geothermal installations, even though the type of drilling used may not be at maximum efficiency during the entire drilling process. This adds to the overall labor and cost of installing such geothermal systems, which contributes to preventing the widespread adoption of this environmentally-friendly technology.

Furthermore, in some regions, local laws and/or regulations prohibit the discharge of tepid water or soil products back into the environment. Such regulations are often most prevalent in residential areas, where it is not desirable to leave big messes following a drilling operation. It can be difficult when using current drilling technologies to address these local regulations and be compliant with same when installing geothermal systems. This also leads to a reduction of the prevalence of this environmentally-friendly heating and cooling technology.

Thus, it would be desirable to improve drilling rigs and methods to allow for efficient drilling through multiple types of underground formations while only using a single drilling rig, as is sometimes required in space-constrained residential and commercial contexts for geothermal systems. It would also be desirable to allow for geothermal system installation in environments where water/soil discharge from the drilling process is constrained by local regulations.

SUMMARY

To achieve these and other technical objectives, a method of installing a geothermal system is provided in accordance with embodiments of the invention. The method includes performing sonic drilling with a drilling rig for at least a first portion of drilling through the earth to form the hole. The method also includes performing non-sonic drilling with the drilling rig for a second portion of drilling through the earth to form the hole. By using sonic and non-sonic drilling, different types of underground formations can be efficiently drilled through using just the one drilling rig, and the process for installing a geothermal system is made more cost efficient and time efficient.

In one embodiment, the method further includes installing a geothermal heat transfer loop into the hole following the sonic drilling and the non-sonic drilling. In another embodiment, the drilling rig operates to insert cylindrical casings into the ground. The step of performing sonic drilling then includes operating a sonic drill head of the drilling rig at a resonant frequency of the cylindrical casings to enhance insertion of the cylindrical casings into the ground. For example, the sonic drill head operates at a frequency of 50 Hz to 150 Hz.

In another embodiment, the method further includes switching between performing sonic drilling and performing non-sonic drilling based on a current formation of soil and/or rock being penetrated underground. The type of drilling is chosen based on whether sonic drilling or non-sonic drilling is more efficient at penetrating the current formation. The non-sonic drilling may be conducted with an air hammer or a water hammer, in some embodiments. The sonic drilling may be conducted as a sonic percussive method in which the sonic head creates vibrational energy along the drill string and a percussive closed face drill bit is used to drill through the earth at the bottom of the hole.

In embodiments where water flow is used to remove cuttings from the hole during the drilling process, the method further includes filtering and recycling water and cuttings removed from the hole during the drilling with a water recycling assembly. The water recycling assembly filters and cleans the water and then supplies this water back to the downhole bit/tool for continued drilling. In another example, the method also includes operating the sonic drill head to provide sonic energy to retrieve a water or air hammer when the water or air hammer becomes stuck or lodged in an underground formation.

In a further embodiment, the drilling rig includes a sonic drill head having a sonic drive motor, a water pump connected to a hydraulic motor, and a hydraulics control system operatively connecting a source of hydraulic fluid to the sonic drill head and to the hydraulic motor. The hydraulics control system includes a first switching valve that controls a stream of high-pressure hydraulic fluid to be directed from the source into the sonic drive motor when performing sonic drilling, and the first switching valve controls the stream of high-pressure hydraulic fluid to be directed from the source to the hydraulic motor operating the water pump when performing non-sonic drilling. The first switching valve thus operates such that only one of the sonic drive motor and the hydraulic motor receives the stream of high-pressure hydraulic fluid during operation of the drilling rig, thereby allowing only one of the sonic drive motor and the hydraulic motor to operate at full speed during drilling operations. The hydraulics control system may further include a second switching valve, which controls a stream of low-pressure hydraulic fluid to be directed form the source to the hydraulic motor operating the water pump when performing sonic drilling. The hydraulic motor is therefore operated at full speed during non-sonic drilling and at a lesser speed during sonic drilling.

Embodiments of the invention also provide a drilling rig to drill a hole for installing a geothermal system. The drilling rig includes a sonic drill head, a sonic drive motor, a non-sonic downhole drilling bit/tool, a water pump, a hydraulic motor, and a hydraulics control system. The sonic drill head is configured to apply vibrational energy to a drill string to perform sonic drilling and thereby enhance advancement of the drill string into the ground. The sonic drive motor is operatively coupled to the sonic drill head and is configured to operate the sonic drill head. The non-sonic downhole drilling bit/tool is selectively moved downhole in the drilling operation to perform non-sonic drilling to advance the drill string. The water pump is configured to supply a pressurized flow of water. The hydraulic motor is operatively coupled to the water pump and is configured to operate the water pump. The hydraulics control system includes a first switching valve, which operates to control a stream of high-pressure hydraulic fluid to be directed from a source into the sonic drive motor when performing sonic drilling, and alternatively, to be directed from the source to the hydraulic motor operating the water pump when performing non-sonic drilling. The first switching valve operates such that only one of the sonic drive motor and the hydraulic motor receives the stream of high-pressure hydraulic fluid during operation of the drilling rig.

In one embodiment, the hydraulics control system also includes a second switching valve, which operates to control a stream of low-pressure hydraulic fluid to be directed from the source to the hydraulic motor operating the water pump when performing sonic drilling. The drilling rig may then further include a support framework mounted on track rollers or wheels and a drill boom pivotally mounted to the support framework. The support framework defines a front end and a rear end on opposite longitudinal ends of the drilling rig. The drill boom moves between a generally horizontal transport position above the support framework and a generally vertical drilling position at the front end of the support framework. The first and second switching valves are mounted on the support framework between the front and rear ends in such a manner to provide easy operator access to the first and second switching valves during operation of the drilling rig.

In a further embodiment, the drilling rig further includes a water tank configured to supply a flow of water to the water pump to provide the pressurized flow of water for drilling operations. The water tank and the water pump are mounted side-by-side along the rear end of the support framework.

In another embodiment, the drilling rig includes a mounting adapter extending between the water pump and the hydraulic motor. The mounting adapted defines a spool-like configuration defined by a first flange and a second flange extending radially outwardly from opposite ends of a hollow stem portion. The first and second flanges each include a plurality of fastener apertures defining bolt circles having differing diameters from one another. As such, the fastener apertures on the first flange are sized to engage corresponding fastener apertures on one of the water pump and the hydraulic motor. The fastener apertures on the second flange are sized to engage corresponding fastener apertures on the other of the water pump and the hydraulic motor. The drilling rig may also include a drive shaft sized to extend through the hollow stem portion of the mounting adapter. The drive shaft includes a first end having a splined periphery and a second end including an elongate keyway. The first end is configured to engage the drive shaft with one of the water pump and the hydraulic motor, while the second end is configured to engage the drive shaft with the other of the water pump and the hydraulic motor.

In yet another embodiment, the drilling rig includes a water recycling assembly operatively coupled to the water pump. The water recycling assembly receives turbid water from the hole generated during the drilling process and then separates cuttings from the hole from the turbid water and filters the water such that a filtered, clean water can be recycled back to the water pump for use in further drilling operations. In one example, the water recycling assembly includes at least one cyclone configured to separate fluid from solids using centrifugal force, at least one shaker configured to separate solids from fluid using mesh screens, and at least one bag filter configured to filter and clean a fluid flow.

Embodiments of the invention further provide a drilling rig configured to drill a hole for installing a geothermal system. The drilling rig includes a support framework mounted on track rollers or wheels, the support framework defining a front end and a rear end on opposite longitudinal ends of the drilling rig. The drilling rig also includes a drill head configured to perform drilling operations to advance a drill string into the ground adjacent the front end of the support framework to form the hole. A water pump is included to supply a pressurized flow of water. The drilling rig includes a hydraulic motor operatively coupled to the water pump and configured to operate the water pump. The hydraulic motor and the water pump are each mounted along the rear end of the support framework. The drilling rig also includes a mounting adapter extending between the water pump and the hydraulic motor. The mounting adapted defines a spool-like configuration defined by a first flange and a second flange extending radially outwardly from opposite ends of a hollow stem portion. The first and second flanges each include a plurality of fastener apertures defining bolt circles having differing diameters from one another. As such, the fastener apertures on the first flange are sized to engage corresponding fastener apertures on one of the water pump and the hydraulic motor. The fastener apertures on the second flange are sized to engage corresponding fastener apertures on the other of the water pump and the hydraulic motor.

In one embodiment, the drilling rig may also include a drive shaft sized to extend through the hollow stem portion of the mounting adapter. The drive shaft includes a first end having a splined periphery and a second end including an elongate keyway. The first end is configured to engage the drive shaft with one of the water pump and the hydraulic motor, while the second end is configured to engage the drive shaft with the other of the water pump and the hydraulic motor.

In another embodiment, the drill head is a sonic drill head configured to apply vibrational energy to the drill string to perform sonic drilling. The drilling rig then further includes a non-sonic downhole drilling bit/tool selectively moved downhole in the drilling operation to perform non-sonic drilling to advance the drill string. The drilling rig performs sonic drilling for a first portion of drilling through the earth to form the hole and performs non-sonic drilling for a second portion of drilling through the earth to form the hole.

Further embodiments of the invention provide a method for recycling water used to remove cuttings in drilling to put back downhole for more drilling operations. To this end, the method includes delivering turbid water from the drilling operation into a water recycling assembly, which may be mounted on a separate support vehicle from the remainder of the drilling rig. The water recycling assembly applies a series of solids separation and filtration steps, such as by using at least one cyclone, at least one shaker, and at least one bag filter. The water recycling assembly collects dried cuttings and these can be bagged for disposal offsite. The water leaving the water recycling assembly is filtered and cleaned to an extent similar to or better than drinking water, and this clean water is then piped back downhole to be used in further drilling operations. As such, water does not need to be disposed of but can instead be re-used over and over, which may be desirable in residential neighborhoods where dumping of turbid water is prohibited by local rules and regulations.

The various embodiments and elements described above can be combined in any manner consistent with the scope of this invention.

BRIEF DESCRIPTION OF THE DRAWINGS

Various additional features and advantages of the invention will become more apparent to those of ordinary skill in the art upon review of the following detailed description of one or more illustrative embodiments taken in conjunction with the accompanying drawings. The accompanying drawings, which are incorporated in and constitute a part of this specification, illustrate one or more embodiments of the invention and, together with the general description given above and the detailed description given below, serve to explain the one or more embodiments of the invention.

DETAILED DESCRIPTION

With reference to FIGS. 1 through 7, one embodiment of a drilling rig 10 that is configured to perform multiple types of drilling is provided in accordance with the present invention. More specifically, the drilling rig 10 includes equipment capable of sonic drilling (including but not limited to sonic percussive drilling) as well as non-sonic drilling (e.g., air hammer drilling, water hammer drilling, rotational bit drilling, and the like). The drilling rig 10 allows for multiple types of drilling on one self-contained rig, which is both space-efficient and designed for use in construction contexts where space constraints are tight, including, for example, residential construction contexts in places like the Northeast U.S. By allowing for multiple drilling types on a single drilling rig 10, the drilling rig 10 is configured to efficiently penetrate through multiple types of underground soil and rock formations to produce a hole, which may then be filled with a geothermal loop and grout in a typical geothermal heat exchange system installation. Accordingly, the drilling rig 10 of this and other embodiments allow for more efficient installation of geothermal heat exchange systems, which should allow for an increase in use of this environmentally-friendly technology. While one embodiment of the drilling rig 10 described in detail below uses water hammer drilling as a secondary non-sonic drilling technology with the sonic drilling, it will be understood that other secondary non-sonic drilling technologies could also be combined with sonic in other embodiments according to the invention.

Figure 1:
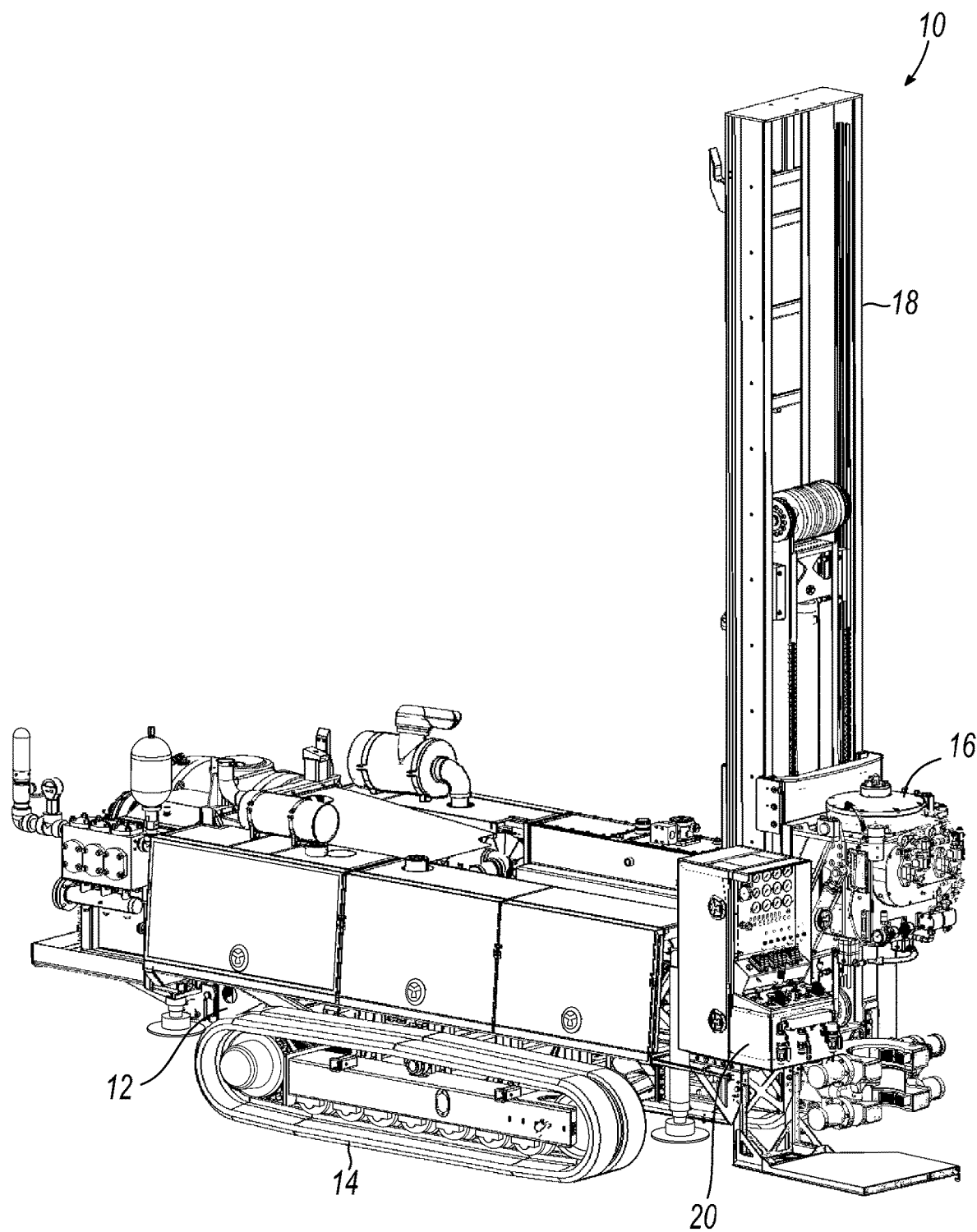
FIG. 1 is a perspective view of a drilling rig used for sonic drilling and non-sonic drilling, in accordance with one embodiment of the invention.

FIG. 1 illustrates the drilling rig 10 in its entirety according to this embodiment. The drilling rig 10 may be track-mounted and generally small in footprint, similar to the TSi 150CC Sonic Drill Rig (also entitled the "Compact Crawler"), commercially available from Terra Sonic International, of Marietta, Ohio. To this end, the drilling rig 10 includes a support framework 12 mounted atop the track rollers 14, with a sonic drill head 16 supported on a pivotable drill boom 18 also mounted on the framework 12. The boom 18 moves between a stowed position in which the boom 18 extends generally horizontally and a drilling position in which the boom 18 extends generally vertically at a front end of the drilling rig 10. A control station 20 for monitoring the operational parameters of the drilling rig 10 and for controlling the drilling rig 10 is provided at the front end as well. In order to allow for water hammer drilling (as a form of non-sonic drilling) as well as the sonic drilling, a high-capacity water pump 22 is added to a back end of the drilling rig 10. The water pump 22 may be used to circulate water in the sonic drilling process as well as to drive an impact hammer in the water hammer drilling process. The drilling rig 10 thus advantageously enables multiple types of drilling on a compact-size rig that is configured for use in space constrained environments such as residential drilling for geothermal installations.

One of the types of drilling enabled by the drilling rig 10 is sonic drilling, in which generation of sound waves is conducted to help a casing successfully penetrate through the rock or soil foundation underneath the drilling rig 10. To this end, the sonic drill head 16 is configured to produce vibrations with frequencies such as in the 50 Hz to 150 Hz range, and the specific frequency chosen during operation is generally coincident with a resonant frequency of the casing string being inserted into the earth. By applying such resonant frequencies, which are in the sonic range, the vibrations are transmitted effectively to the drill bit or casing end, even when more weight and length are added as the casing string extends significant distances into the ground. Thus, sonic drilling with the drilling rig 10 is used during at least a portion of a drilling process for a geothermal system, particularly when this type of drilling is most efficient at advancing the casing and forming the hole needed.

One particular type of sonic drilling that may be used with embodiments of this invention is sonic percussive drilling. In such methods, the sonic drill head 16 creates vibrational energy with sound waves and propagates same along the drill string to a percussive closed-face bit that is located downhole. The percussive closed face bit drills through overburden or rick and allows for further efficient advancement of the drill string/casings. As will be set forth in further detail below, water is pumped downhole to pick up cuttings and debris generated from the drilling process and then the water washes these cuttings and debris back to the surface.

Figure 2:
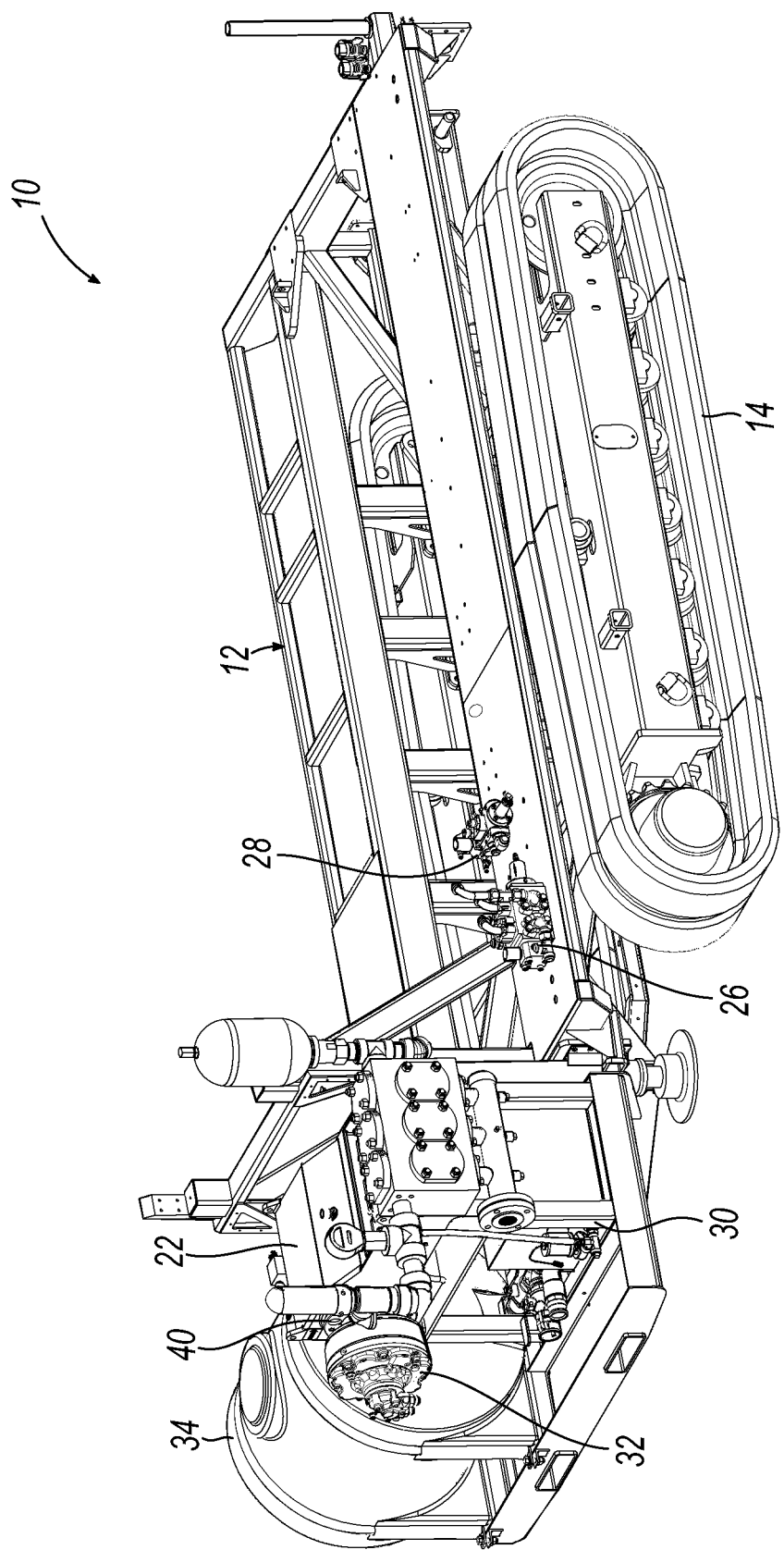
FIG. 2 is a perspective view of the framework, the water pump and water pump hydraulic motor, and control switching valves used with the drilling rig of FIG. 1.
Figure 3:
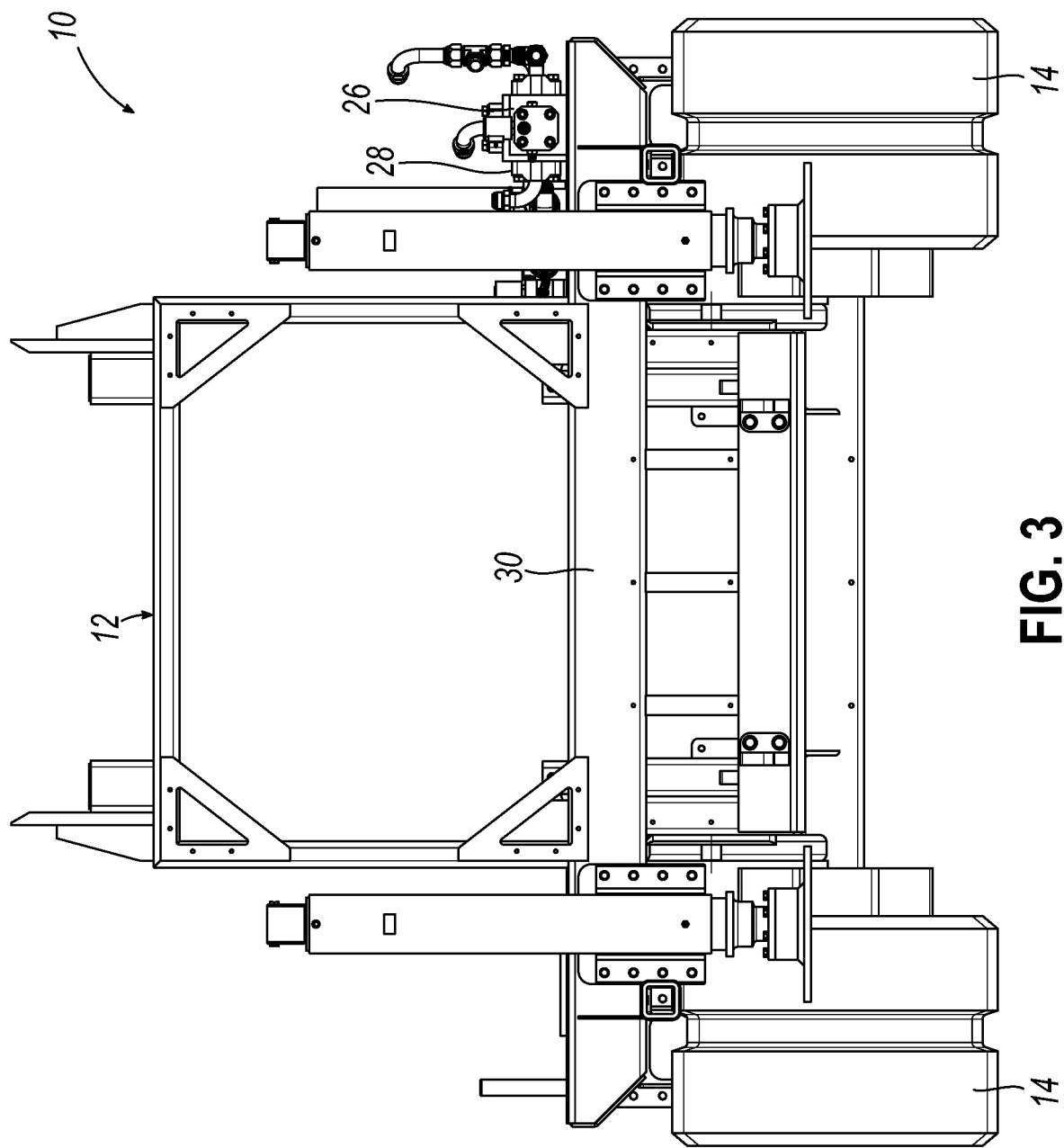
FIG. 3 is an end view of the framework of the drilling rig of FIG. 2.

Now turning to FIG. 2, the drilling rig 10 is shown again with several elements removed so that newly-added features are illustrated in detail. Along a portion of the support framework 12 located opposite the front end where the drill boom 18 and control station 20 are normally shown, first and second switching valves 26, 28 have been mounted and included in the hydraulics system for the drilling rig 10. As will be explained in further detail below, the first and second switching valves 26, 28 control flow of hydraulic fluid such that the appropriate set of components on the drilling rig 10 can be supplied with power for the type of drilling operation being conducted with the drilling rig 10. It will be understood that the particular positioning of these first and second switching valves 26, 28 may be modified in other embodiments from the layout shown in FIG. 2, without departing from the scope of the invention. However, the switching valves 26, 28 and their functionality should be provided to efficiently operate the drilling rig 10, regardless of the positioning of all hydraulic conduits and components. One benefit of the positioning of the first and second switching valves 26, 28 shown in FIG. 2 is that the valves are positioned for easy access, should that be required to control or provide maintenance to these elements.

The support framework 12 has been modified from a conventional drill to properly support a larger water pump 22 configured to allow for various types of non-sonic drilling, such as (but not limited to) water hammer type drilling on the drilling rig 10. Vertically-extending portions of the support framework 12 are shown in more detail in FIGS. 2 and 3, adjacent a rear end of the drilling rig 10, and these portions define a pump support 30. The water pump 22 and the hydraulic motor 32 for driving the water pump 22 are positioned adjacent the rear end by the support framework 12, which is visible in FIGS. 2 and 4. In one example, the water pump 22 is a "TT-150" triplex pump commercially available from Tulsa Rig Iron, of Kiefer, Okla. The water pump 22 in such embodiments is configured to produce up to 150 gallons per minute of continuous flow, while maintaining a relatively small size that works on a compact rig such as the drilling rig 10 of this embodiment. It will be understood that alternative water pumps may be used in other embodiments. In one example, the hydraulic motor 32 is a "TF 2.5-500" fixed displacement radial piston hydraulic motor commercially available from SAI S.P.A., of Italy. It will be appreciated that alternative motors can be included in the design in further embodiments of the invention, as this is but one working example of the drilling rig 10 of this invention. Also visible in FIGS. 2 and 4 is the water tank 34 from which the water pump 22 can draw during operation, the water tank 34 in the illustrated embodiment being configured to hold at least 125 gallons.

Figure 4:
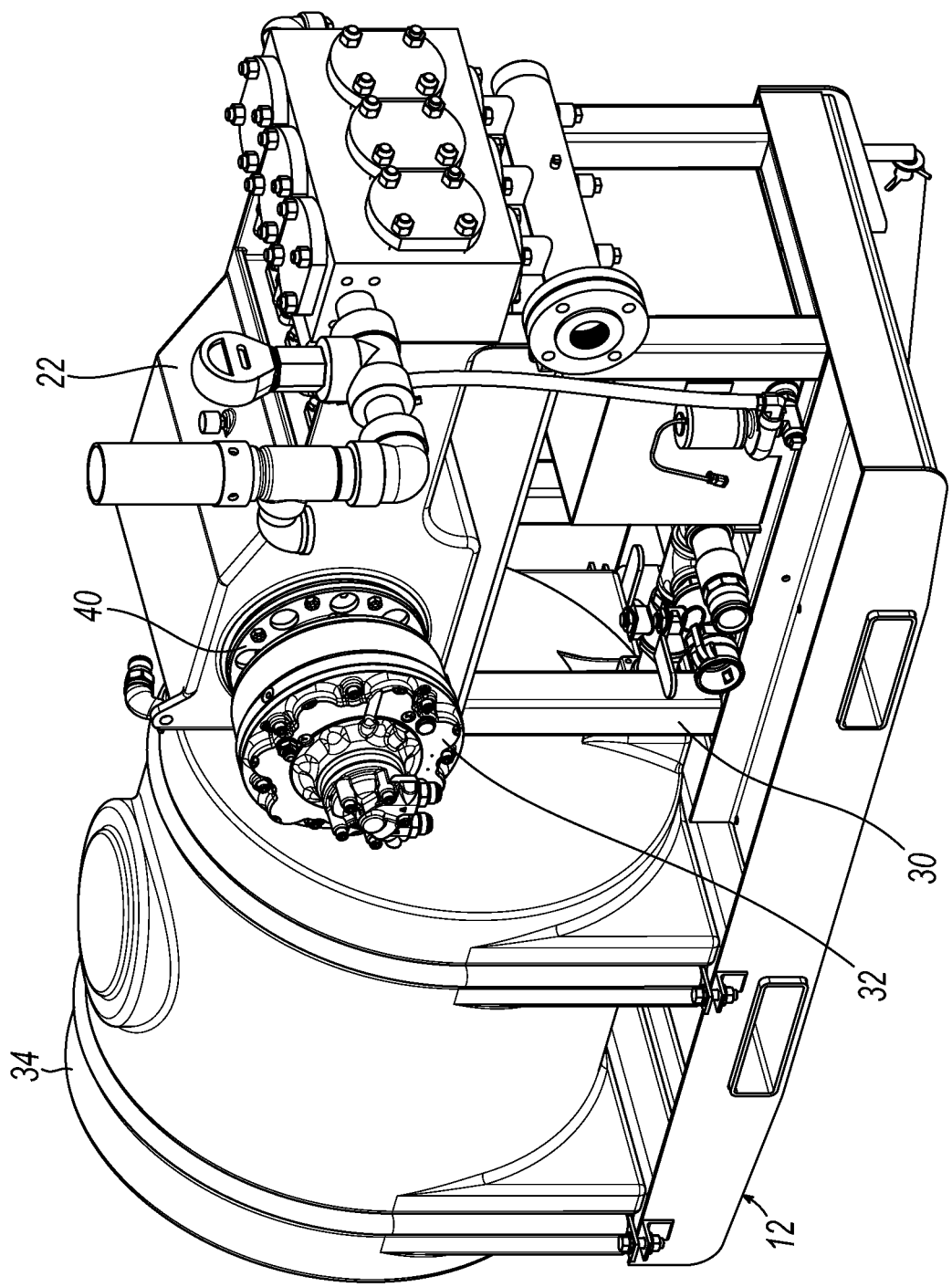
FIG. 4 is a perspective view of the water pump and water pump motor used with the drilling rig of FIG. 2.
Figure 5:
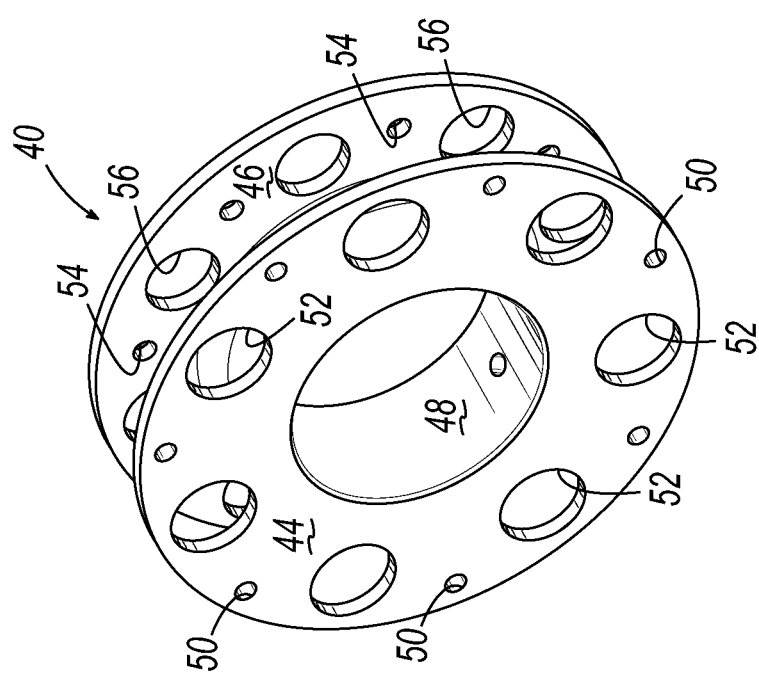
FIG. 5 is a detailed perspective view of a mounting adapter used to couple the water pump and the water pump motor of FIG. 4.

In order to make the above-described hydraulics components shown in FIGS. 2 and 4 work together on the drilling rig 10, a new mounting adapter 40 and drive shaft 42 were developed for connecting the hydraulic motor 32 to the water pump 22. The mounting adapter 40 can be seen in operative position in FIG. 4, but it is more clearly illustrated in FIG. 5, while the drive shaft 42 is shown separately in FIG. 6. Beginning with reference to the mounting adapter 40, FIG. 5 shows that the mounting adapter 40 defines a spool-shaped structure defined by a first flange 44 and a second flange 46 spaced apart from one another with a stem portion 48 extending between the first and second flanges 44, 46. One of the flanges 44, 46 is configured to be connected with the hydraulic motor 32, while the other of the flanges 44, 46 is configured to be connected with the water pump 22. To this end, the coupling elements of the water pump 22 and the hydraulic motor 32 selected for use in the example above define different fastener bolt circles of varying diameter, and these coupling elements cannot be mated without the provision of some form of adapter. Thus, the mounting adapter 40 has been developed to provide the operative coupling to secure the hydraulic motor 32 on the water pump 22.

With continued reference to FIG. 5, the first flange 44 includes a series of seven (7) first fastener apertures 50 equally spaced radially around a central axis through the mounting adapter 40. Interspersed between each pair of the first fastener apertures 50 is a larger first hole 52, and the series of larger first holes 52 is provided to reduce the material and weight of the first flange 44. The first fastener apertures 50 in this embodiment may define a bolt circle diameter of about 11.812 inches, with each of the first fastener apertures 50 being formed by a ½-inch drill bit. The larger first holes 52 define a bolt circle of 10.25 inches in diameter, with each of the larger first holes 52 being formed by a 2-inch drill bit. Similarly, the second flange 46 includes a series of eight (8) second fastener apertures 54 equally spaced radially around the same central axis of the mounting adapter 40. Interspersed between each pair of the second fastener apertures 54 is a larger second hole 56, which are again provided to reduce the material and weight of the second flange 46. The second fastener apertures 54 in this embodiment may define a bolt circle diameter of about 10.5 inches, with each of the second fastener apertures 54 being formed by a ⁷⁄₃₂-inch drill bit. The larger second holes 56 define a bolt circle of 10.0 inches in diameter, with each of the larger second holes 56 being formed by a 1 ¾-inches drill bit. It will be understood that these diameters and dimensions are exemplary for this embodiment and may be adjusted in other embodiments, such as if the hydraulic motor 32 or the water pump 22 is changed to an alternative design. The mounting adapter 40 assures that the hydraulic motor 32 is properly positioned and mounted at the water pump 22.

Figure 6:
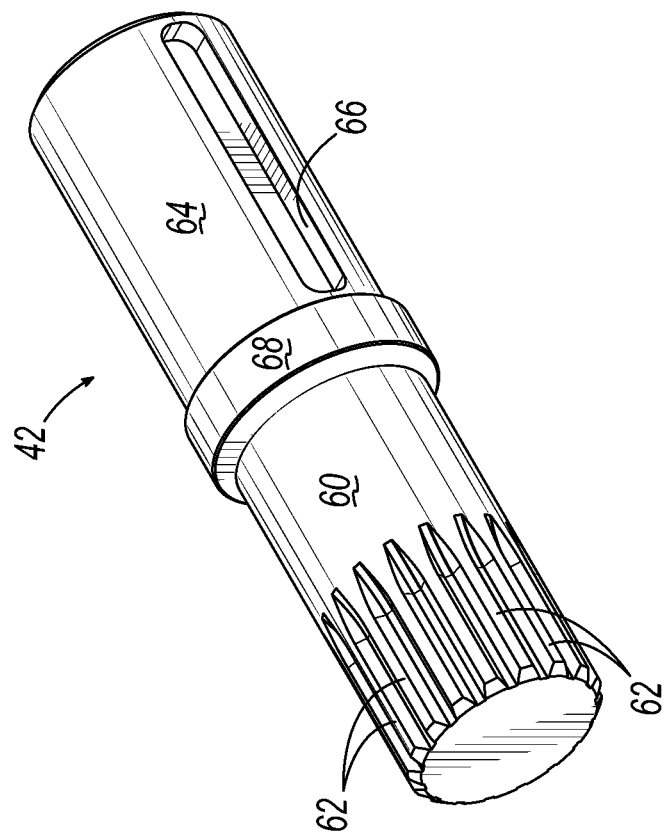
FIG. 6 is a detailed perspective view of a drive shaft coupling the water pump to the water pump motor of FIG. 4.

The water pump 22 and the hydraulic motor 32 are further connected by the drive shaft 42 shown in FIG. 6. The drive shaft 42 is sized to fit through the stem portion 48 of the mounting adapter 40. In this embodiment, the drive shaft 42 includes a first end 60 that is generally cylindrical in shape but for the provision of splines 62 around the periphery of the first end 60. The splines 62 may extend along a usable length of about 1.45 inches when the first end 60 extends along a total length of 4.125 inches. The drive shaft 42 also includes a second end 64 that is generally cylindrical in shape but for the provision of an elongated keyway 66 cut along a majority of the length of the second end 64. For example, the second end 64 may be about 3.85 inches in total length, and the keyway may be about 3.5 inches in total length (and 0.5 inch in width). The first and second ends 60, 64 of the drive shaft 42 of FIG. 6 are connected by a central portion 68 which is bigger in diameter than the first and second ends 60, 64. The central portion extends along a length of 0.65 inch in the illustrated embodiment. The terminal ends of the first and second ends 60, 64 and of the central portion 68 may be formed with a radius of curvature to avoid sharp transitions that could generate additional stress or fatigue points on the drive shaft 42. The first end 60 is configured to engage with the hydraulic motor 32 while the second end 64 is configured to engage with the water pump 22, or vice versa. In this regard, the drive shaft 42 of this invention successfully connects the hydraulic motor 32 to the water pump 22 in a driving arrangement so that these elements operate one another as desired. The specific dimensions of elements on the drive shaft 42 may be modified in other embodiments without departing from the scope of the invention.

The mounting adapter 40 and the drive shaft 42 are formed from 4140 steel material in this embodiment. These elements in conjunction advantageously assure that the hydraulic motor 32 functions to drive the water pump 22 during both sonic drilling and non-sonic drilling operations at the drilling rig 10. In one example, both non-sonic type drilling and sonic drilling are enabled by this arrangement of components newly developed for the drilling rig 10.

Figure 7:
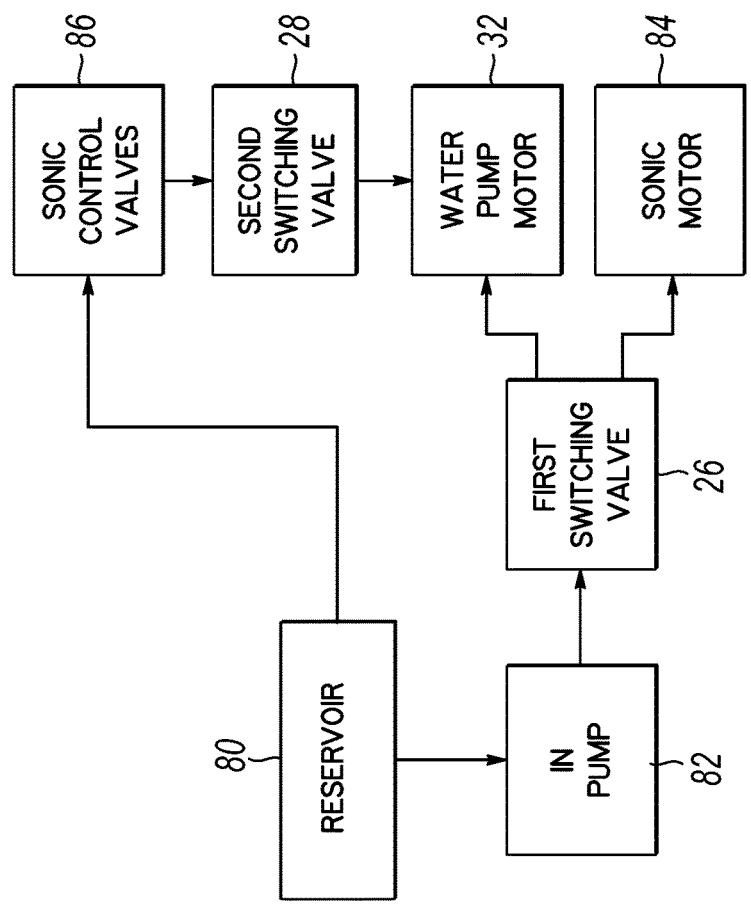
FIG. 7 is a schematic black box diagram of a relevant portion of the hydraulics circuit used with the drilling rig of FIG. 1, including the two switching valves previously shown in FIG. 2.

Now turning with reference to FIG. 7, a simplified schematic of the hydraulics of the drilling rig 10 is provided to show how the first and second switching valves 26, 28 function. A source of hydraulic fluid is labeled as a reservoir 80 in FIG. 7, and this element is connected with a hydraulic inlet pump 82 as shown. The hydraulic inlet pump 82 delivers flow of hydraulic fluid to the first switching valve 26, which functions to deliver flow to only one of the downstream branches extending from the first switching valve 26. In this regard, the first switching valve 26 operates to deliver the flow from the hydraulic inlet pump 82 into either the sonic drive motor 84 (that operates the sonic drill head 16 for sonic drilling operations) or the water pump motor, which is the hydraulic motor 32 described in detail above. When sonic drilling is desired, all the hydraulic fluid flow from the hydraulic inlet pump 82 is provided to the sonic drive motor 84, and when water hammer drilling is desired as a non-sonic drilling type, all the hydraulic fluid flow from the hydraulic inlet pump 82 is directed to the hydraulic motor 32. The high amount of flow and pressure provided through the first switching valve 26 is sufficient to operate either the sonic drill head 16 at full speed or the water pump 22 at full speed (for enabling water hammer drilling functions, in this example).

In the hydraulics, the reservoir 80 is also connected to a bank of sonic control valves 86 that are used to control certain elements or features of the drilling rig 10, specifically during operation of sonic drilling functions. This bank of sonic control valves 86 is the same as would be provided on a conventional Compact Crawler sonic drill design, for example. One of the sonic control valves 86 can be routed to supply hydraulic fluid flow to the second switching valve 28 as shown, and the second switching valve 28 provides on/off control of such fluid flow to the water pump motor, e.g., the hydraulic motor 32. It will be appreciated that the flow and pressure of hydraulic fluid provided through the second switching valve 28 is less than that provided through the first switching valve 26, and this is because the water pump 22 does not need to be operated at the maximum speed when water is to be used in the sonic drilling operation. Thus, when the first switching valve 26 is used to deliver high pressure and flow of hydraulic fluid to the sonic drive motor 84 during a sonic drilling operation, the second switching valve 28 may be used to allow a smaller pressure and flow of hydraulic fluid to the hydraulic motor 32 that operates the water pump 22. These flow paths through the hydraulics system of the drilling rig 10 are completely independent and separate from one another. When the first switching valve 26 is used to deliver high pressure and flow of hydraulic fluid to the hydraulic motor 32 during a non-sonic drilling operation, the second switching valve 28 blocks flow between the block of sonic control valves 86 and the hydraulic motor 32. The provisions of the first and second switching valves 26, 28 advantageously provides differing amounts of hydraulic fluid pressure and flow to the motors of the drilling rig 10 based on which type of drilling operation is to be conducted. To this end, the first and second switching valves 26, 28 allow a single set of hydraulics on the drilling rig 10 to operate multiple types of drilling.

Figure 8:
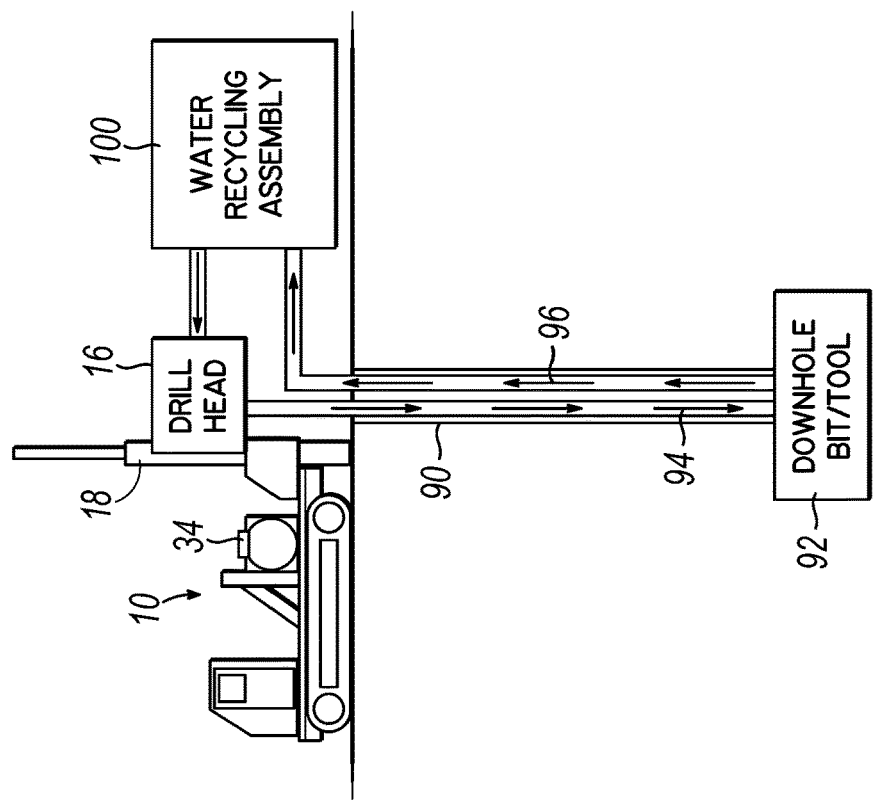
FIG. 8 is a schematic illustration of a drilling process using water recycling, in accordance with another embodiment of the invention.

As noted above, the drilling rig 10 of this invention functions to perform sonic drilling when the underground formations are most efficiently penetrated using that type of drilling. After pushing through the overburden, it often becomes more efficient to drill using impact type drilling or another type of non-sonic drilling. Thus, the drilling rig 10 of this invention is configured to employ non-sonic drilling during at least a portion of the drilling process of a geothermal system installation, particularly when this type of drilling is most efficient at advancing the casing and forming the hole needed. Non-sonic drilling is particularly effective at drilling through hard rock formations such as sandstone or granite. This type of drilling is also effective when there is significant water within the ground being drilled, as is the case in locations like the Northeast U.S. A schematic of non-sonic drilling in accordance with this invention is shown in FIG. 8.

To this end, the drilling rig 10 is shown with the drill head 16 in position over the hole 90 formed in the earth, which may be initially formed using sonic drilling as noted above.

Instead of using the drill head 16 with sonic actuation, a downhole drilling bit/tool 92, which may be a water hammer or some other type of bit or device as well understood in the drilling art, is positioned down bore adjacent a leading end of the drill/casing string. In a typical operation when the downhole drilling bit/tool 92 is a water hammer, the water hammer has a piston inside of it that cycles up and down rapidly, thereby hitting the top of the drill bit, which then transfers the force of each of the hits to the rock/soil. The movement of the water hammer is driven by high pressure water flow from the water pump 22, shown by the downward arrows 94 (drawn from the drill head 16 for simplicity of illustration). Regardless, in any type of drilling operation, water is supplied by the water pump 22 in this manner to allow high pressure water to be forced through the hollow drill pipe to also remove the cuttings from the hole 90. There are typically carbide bits or tips on the face of the drill bit. The bit hits the ground every fraction of a second in impact drilling methods while the rotation of the drill string (drill pipe) places the carbide tips where they can have fresh rock to strike and shatter. The used water then takes those small particles of rock/soil (cuttings) and pushes them away from the downhole drilling bit/tool 92 and up through the bore hole as shown by upward arrows 96 to the surface.

In many traditional drilling operations, the turbid water and cuttings emerging from the bore hole 90 are discharged somewhere at the surface. However, if geothermal systems are being installed in residential areas with significant space constraints (e.g., at a house surrounded closely by other residential units as is common in areas of the Northeast U.S.), it may not be feasible to discharge turbid water and cuttings at the surface because of local regulations of dumping water of this type. As such, in order to allow for drilling in these environments, a method of recycling the water and disposing of the cuttings is developed according to one embodiment of this invention. This method is reflected in the additional items shown in FIG. 8 and now described.

To this end, the water and cuttings discharged from the bore hole 90 are directed into a water recycling assembly 100, which may be a separate track or wheel-mounted vehicle with several filtration and shaking elements on board. The water recycling assembly 100 separates the cuttings from the water and filters the water to purify it to drinking level or the like. The filtered or recycled water is then circulated back to the water pump 22 and downhole to the downhole drilling bit/tool 92 for use again in the drilling process. The filtered or recycled water must be free from particles and contaminants because any such particles can negatively impact operation of and quickly wear on the downhole drilling bit/tool 92. As a result, the filtered or recycled water is also sufficiently clean to comply with local regulations on dumping water. The dried cuttings and other particulate removed from the water can be deposited by the water recycling assembly 100 into large bags which can be transported offsite as needed. Thus, the water recycling assembly 100 continues to allow for the use of multiple types of drilling in space constrained and/or residential areas. It will be understood that the same water circulation and recycling may be used with the sonic drilling as well, such as sonic percussive drilling with a percussive closed face bit as the downhole bit/tool.

In one embodiment provided as an example, the water recycling assembly 100 includes the following filtration and shaking elements. The water and cuttings is directed through a well head diverter to one or more cyclones, which separate fluid from solids using centrifugal force, and then a series of shakers with different mesh size screens used in the shakers, and finally, one or more bag filters. It will be appreciated that a different set of such elements may be provided in other embodiments of the drilling method described herein, so long as the water coming back from the borehole 90 is sufficiently filtered and purified before sending back to the downhole drilling bit/tool 92.

Thus, the drilling rig 10 and methods described herein for this invention advantageously allow for multiple types of drilling to be used to create a hole 90 in the earth for a geothermal system installation or the like in the most efficient manner possible. Such holes may be typically 150 to 400 feet in depth, or deeper, depending on the design of the specific geothermal system to be placed downhole. To this end, sonic drilling is used by the drilling rig 10 when that type of drilling is most efficient at penetrating the formation under the earth, and then a form of non-sonic drilling is used when it becomes more efficient. The two types of drilling can be interchanged at various depths depending on the terrain underground encountered by the drilling crew, and thus, the drilling rig 10 and methods described herein allow for geothermal system installation to be done in many different types of locales. In one example, the sonic drill may be used to dislodge and extract a stuck air or water hammer, when that occurs in the middle of air or water hammer drilling, which would not have been possible without the provision of sonic drilling. In addition to enabling installation in space constrained residential areas, this technology development can help geothermal heating and cooling achieve greater market penetration thanks to the added efficiencies in the process. Thus, the embodiments described above improve these fields of drilling, and especially in the field of geothermal system installation.

Furthermore, it will be appreciated that while the embodiments of the invention described herein have focused on the advantages achieved for the geothermal system installation field, other commercial drilling functions can also be performed using the drilling rig 10 having two or more types of drilling technology enabled. Thus, the use of the drilling rig 10 may extend to other fields where similar advantages can be achieved by this drilling rig 10 and its methods of operation.

While the present invention has been illustrated by the description of various embodiments thereof, and while the embodiments have been described in considerable detail, it is not intended to restrict or in any way limit the scope of the appended claims to such detail. Thus, the various features discussed herein may be used alone or in any combination. Additional advantages and modifications will readily appear to those skilled in the art. The invention in its broader aspects is therefore not limited to the specific details and illustrative examples shown and described. Accordingly, departures may be made from such details without departing from the scope of the general inventive concept.

What is claimed is:

1. A method of installing a geothermal system, comprising:
    performing sonic drilling with a drilling rig for at least a first portion of drilling through the earth to form a hole, wherein the sonic drilling includes sonic percussive drilling using a percussive closed face bit in the hole and application of sonic vibrational energy to the percussive closed face bit to bore into the earth; and
    performing non-sonic drilling with the drilling rig for a second portion of drilling through the earth to form the hole, wherein the non-sonic drilling includes air hammer drilling conducted with an air hammer;

filtering and recycling water and cuttings removed from the hole during the drilling with a water recycling assembly;

supplying water filtered by the water recycling assembly back to a downhole drilling bit/tool for continued drilling, and installing a geothermal heat transfer loop into the hole following the sonic drilling and the non-sonic drilling, wherein a string of drill casings is advanced into the earth to form the hole by both the sonic drilling and by the non-sonic drilling, such that both types of drilling are used alternatively to advance the same string of drill casings.

2. The method of claim 1, wherein the drilling rig operates to insert cylindrical casings into the ground, and the step of performing sonic drilling further comprises:

operating a sonic drill head of the drilling rig at a resonant frequency of the cylindrical casings to enhance insertion of the cylindrical casings into the ground.

3. The method of claim 2, wherein the sonic drill head of the drilling rig operates at a frequency of 50 Hz to 150 Hz.

4. The method of claim 1, further comprising:

switching between performing sonic drilling and performing non-sonic drilling based on a current formation of soil and/or rock being penetrated underground, wherein the type of drilling is chosen based on whether sonic drilling or non-sonic drilling is more efficient at penetrating the current formation.

5. The method of claim 1, further comprising:

operating a sonic drill head to provide sonic energy to retrieve the air hammer when the air hammer becomes stuck or lodged in an underground formation.

6. A drilling rig configured to drill a hole for installing a geothermal system, comprising:

a sonic drill head configured to apply vibrational energy to a drill string to perform sonic drilling and thereby enhance advancement of drill string;

a sonic drive motor operatively coupled to the sonic drill head and configured to operate the sonic drill head;

a downhole drilling bit/tool selectively moved downhole in a drilling operation to perform non-sonic drilling to advance the drill string;

a water pump configured to supply a pressurized flow of water;

a hydraulic motor operatively coupled to the water pump and configured to operate the water pump; and a hydraulics control system including a first switching valve, which operates to control a stream of high-pressure hydraulic fluid to be directed from a source into the sonic drive motor when performing sonic drilling, and alternatively, to be directed from the source to the hydraulic motor operating the water pump when performing non-sonic drilling, wherein the first switching valve operates such that only one of the sonic drive motor and the hydraulic motor receives the stream of high-pressure hydraulic fluid during operation of the drilling rig.

7. The drilling rig of claim 6, wherein the hydraulics control system also includes a second switching valve, which operates to control a stream of low-pressure hydraulic fluid to be directed from the source to the hydraulic motor operating the water pump when performing sonic drilling.

8. The drilling rig of claim 7, further comprising:

a support framework mounted on track rollers or wheels, the support framework defining a front end and a rear end on opposite longitudinal ends of the drilling rig;

a drill boom pivotally mounted to the support framework to move between a generally horizontal transport position above the support framework and a generally vertical drilling position at the front end of the support framework, wherein the first and second switching valves are mounted on the support framework between the front and rear ends in such a manner to provide easy operator access to the first and second switching valves during operation of the drilling rig.

9. The drilling rig of claim 6, further comprising:

a mounting adapter extending between the water pump and the hydraulic motor, the mounting adapter defining a spool-like configuration defined by a first flange and a second flange extending radially outwardly from opposite ends of a hollow stem portion, wherein the first and second flanges each include a plurality of fastener apertures defining bolt circles having differing diameters from one another, such that the fastener apertures on the first flange are sized to engage corresponding fastener apertures on one of the water pump and the hydraulic motor, and such that the fastener apertures on the second flange are sized to engage corresponding fastener apertures on the other of the water pump and the hydraulic motor.

10. The drilling rig of claim 9, further comprising:

a drive shaft sized to extend through the hollow stem portion of the mounting adapter, the drive shaft including a first end having a splined periphery and a second end including an elongate keyway, wherein the first end is configured to engage the drive shaft with one of the water pump and the hydraulic motor while the second end is configured to engage the drive shaft with the other of the water pump and the hydraulic motor.

11. The drilling rig of claim 6, further comprising:

a water recycling assembly operatively coupled to the water pump, the water recycling assembly receiving turbid water from the hole generated during a drilling process and then separating cuttings from the hole from the turbid water and filtering the water such that a filtered, clean water can be recycled back to the water pump for use in further drilling operations, and the water recycling assembly including the following components:

at least one cyclone configured to separate fluid from solids using centrifugal force;

at least one shaker configured to separate solids from fluid using mesh screens; and at least one bag filter configured to filter and clean a fluid flow.

* * * * *